United States Patent
Donhauser

(10) Patent No.: US 6,527,490 B1
(45) Date of Patent: Mar. 4, 2003

(54) PUNCHING, STAMPING RIVET

(75) Inventor: Georg Donhauser, Amberg (DE)

(73) Assignee: Kerb-Konus-Vertriebs-GmbH, Amberg (DE)

(*) Notice: Subject to any disclaimer, the term of this patent is extended or adjusted under 35 U.S.C. 154(b) by 0 days.

(21) Appl. No.: 09/575,054

(22) Filed: May 19, 2000

(51) Int. Cl.$^7$ ................................. F16B 15/08
(52) U.S. Cl. ................ 411/455; 411/504; 29/520; 29/432
(58) Field of Search ................ 411/504, 179, 411/180, 455, 456, 453, 451.2, 451.3; 29/520, 432

(56) References Cited

U.S. PATENT DOCUMENTS

| | | | |
|---|---|---|---|
| 1,912,222 A | * | 5/1933 | Rosenberg |
| RE19,792 E | * | 12/1935 | Rosenberg |
| 2,196,144 A | * | 4/1940 | Eckler |
| 2,896,285 A | * | 7/1959 | Morin |
| 3,827,131 A | * | 8/1974 | Coltrin |
| 3,909,913 A | * | 10/1975 | Tildesley |
| 4,130,922 A | * | 12/1978 | Koett |
| 4,757,596 A | | 7/1988 | Herb |
| 4,815,907 A | * | 3/1989 | Williamson |
| 4,978,270 A | * | 12/1990 | Ackerman |

FOREIGN PATENT DOCUMENTS

| | | |
|---|---|---|
| DE | 297 07 669 | 8/1997 |
| FR | 869 873 | 12/1978 |

* cited by examiner

Primary Examiner—Flemming Saether
(74) Attorney, Agent, or Firm—Flynn, Thiel, Boutell & Tanis, P.C.

(57) ABSTRACT

A punching, stamping rivet has a frustum-shaped rivet head and a shank following thereafter. In order to create a rivet connection between two adjoining structural parts, the shank is punched through the structural parts forming a punched hole, and a groove is coined thereafter around the shank end in that structural part. In order to be able to process structural parts having varied thicknesses, several shank grooves are arranged on the shank, into which shank grooves material penetrates under plastic deformation during the coining of the groove.

5 Claims, 3 Drawing Sheets

PUNCHING, STAMPING RIVET

FIELD OF THE INVENTION

The invention relates to a punching, stamping rivet including a rivet head, shank, and plural grooves in the shank.

BACKGROUND OF THE INVENTION

Punching, stamping rivets are used to connect two or more flat workpieces. The shank of the rivet is hereby pressed (punched) through the workpieces forming two punch holes. The lower workpiece, viewed in punching direction, consists of a plastically deformable material, usually a sheet metal. The shank has a shank groove near the shank end. An annular ring is stamped after the punching operation around the shank end into the lower workpiece by a press tool, thus pressing material of the lower workpiece into the shank groove.

The shank groove has in the case of a polygonal rivet a trapezoidal shape in cross section. When workpieces of a hard material are processed, then there exists the danger that the shank will break in the area of the shank groove.

The punching, stamping rivet has a length which corresponds with the desired thickness of both workpieces. When the actual thickness is less than the desired thickness, then not enough material of the lower workpiece is pressed into the shank groove, which affects the strength of the rivet connection.

A further disadvantage of the known punching, stamping rivet is that the desired length of the rivet corresponds with the desired thickness of the adjoining structural parts. When one of the structural parts is significantly thinner than specified, a rivet connection cannot be created.

SUMMARY OF THE INVENTION

The purpose is to provide a punching, stamping rivet in such a manner that the aforementioned tolerances in the thickness of the structural parts does not affect the strength of the rivet connection. A further purpose is to provide the punching, stamping rivet in such a manner that materials of varied thicknesses can be processed.

BRIEF DESCRIPTION OF THE DRAWINGS

One exemplary embodiment will be discussed in greater detail hereinafter in connection with the drawings, in which.

DETAILED DESCRIPTION

Figure 1:
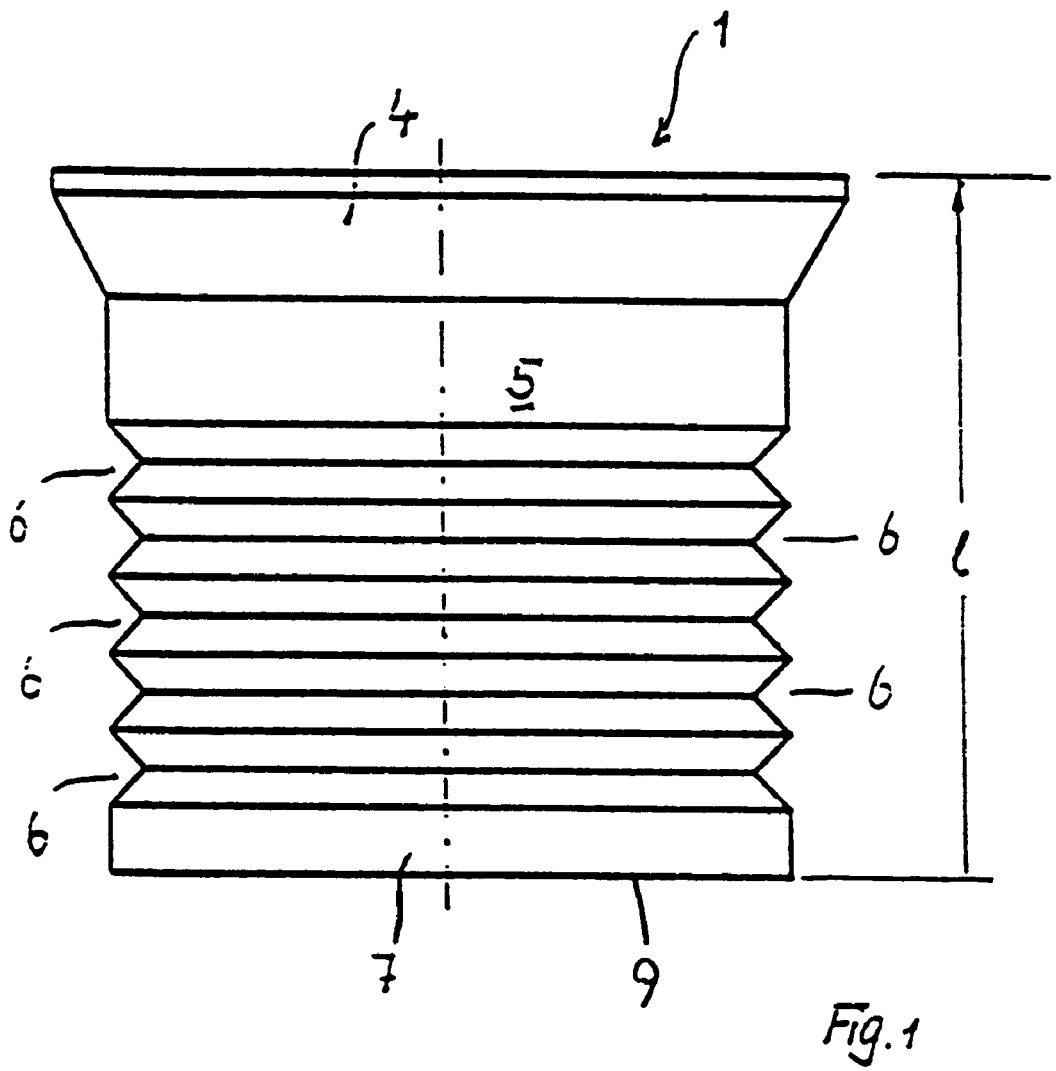
FIG. 1 is a side view of the punching, stamping rivet.

The punching, stamping rivet is identified in its entirety by the reference numeral 1. The rivet connection created with the rivet connects an upper sheet-metal part 2 to a lower sheet-metal part 3A or 3B. The rivet 1 has a frustum-shaped rivet head 4 and a shank 5 fixed thereto and extending therefrom. The shank 5 has several shank grooves 6 and a cylindrical section 7 oriented between the shank grooves 6 and a distal end 9 of the shank 5.

In order to create the rivet connection, the rivet 1 is pressed (punched) from above downwardly through the sheet-metal parts 2, 3A or 3B, thus creating punched holes aligned with one another in the sheet-metal parts 2, 3. After the punching operation has been completed, a groove 8A or 8B is coined around the shank 5 by means of an annular press tool, which causes the material of the lower sheet-metal plate 3A or 3B to be pressed into shank grooves 6 while being plastically deformed so as to fill the grooves 6.

Figure 2:
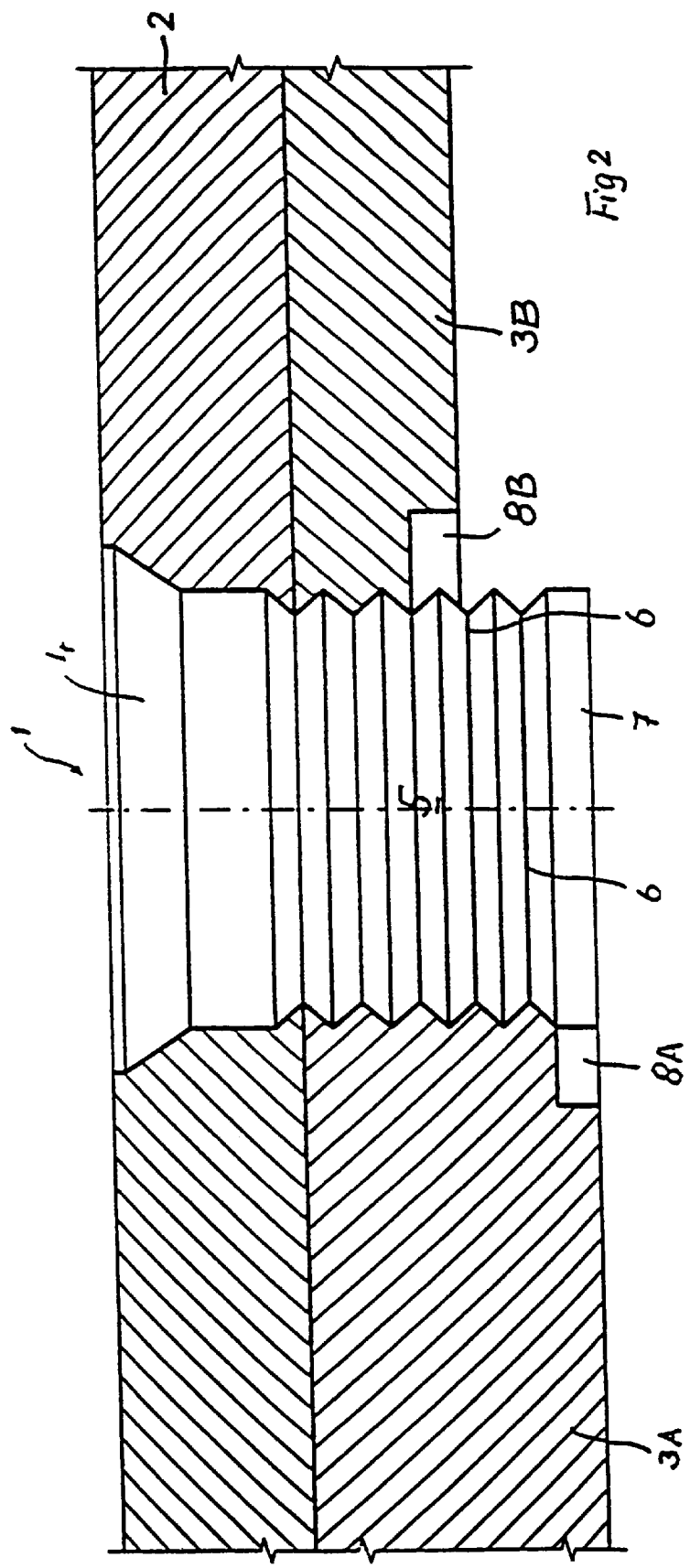
FIG. 2 illustrates the punching, stamping rivet according to FIG. 1 for the connection of structural parts having varied thicknesses.
Figure 3:
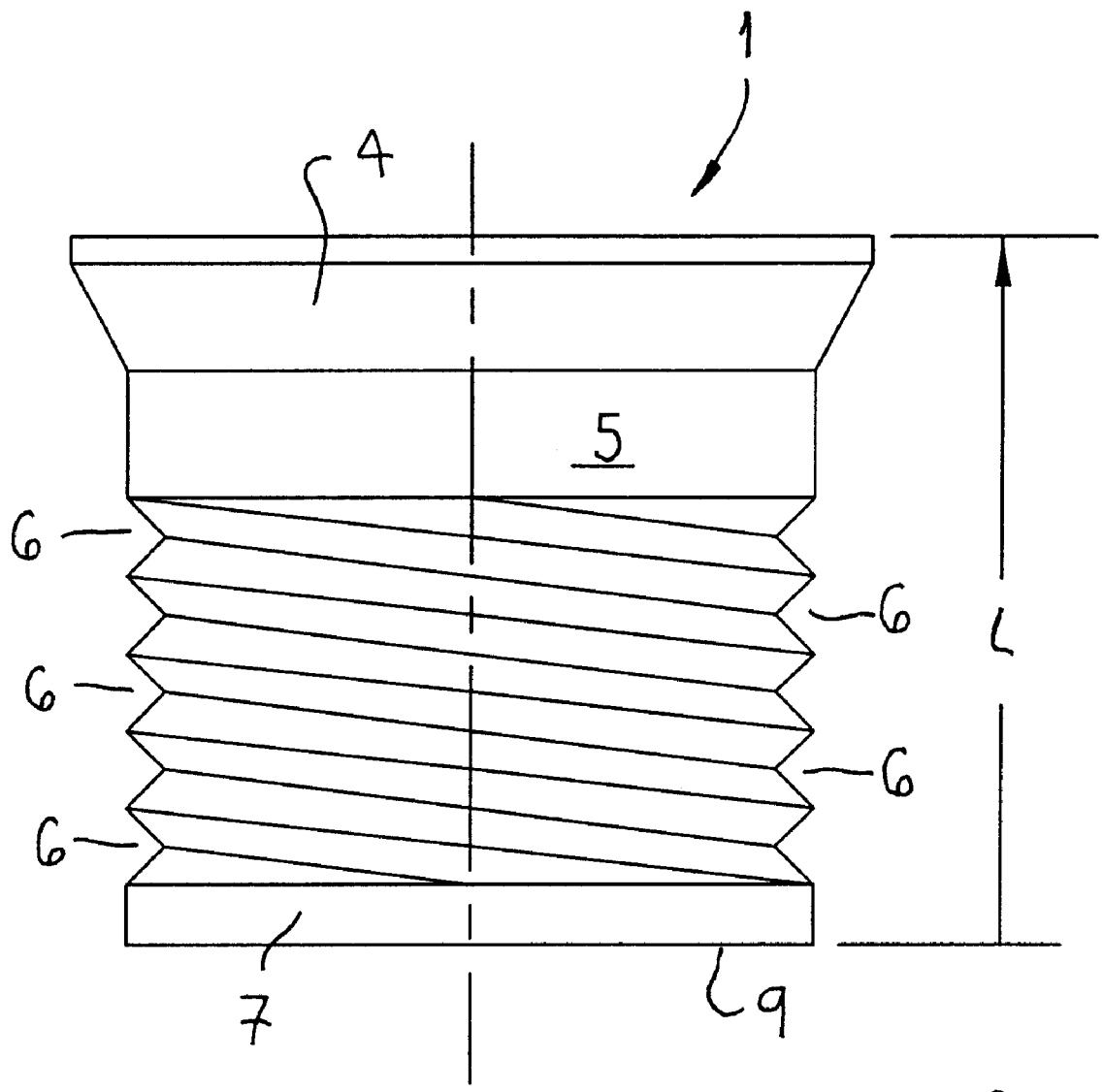
FIG. 3 is a side view of the punching, stamping rivet having a helical groove.

The total thickness of the two sheet-metal parts 2, 3A corresponds in the left-side illustration in FIG. 2 with the length 1 of the rivet 1. The groove 8A is coined around the section 7 so that through this coining material is primarily pressed into the lower shank groove 6 so as to fill it.

The total thickness of the sheet-metal parts 2, 3B is less in the right-side illustration in FIG. 2 than the length 1 of the rivet 1. The groove 8B is created in the sheet-metal part 3B in the mid-length portion of the section of the shank 5, which section has the grooves 6, which causes material to be primarily pressed into the grooves 6 lying thereabove so as to fill same.

As can be seen, the sheet-metal parts 3A, 3B can have varied thicknesses. By providing several shank grooves 6, it is also possible to create rivet connections in sheet-metal parts 2, 3, which have significantly varied thickness tolerances.

The shank grooves 6 are designed annularly in the illustrated exemplary embodiment. However, it is also possible to arrange the shank grooves 6 helically. The shank grooves have a triangular cross section in the illustrated exemplary embodiment. However, it is also possible that the shank grooves are designed concavely. In particular, the section of each shank groove, which section faces the rivet head 4, is then arranged at a flatter angle with respect to the shank axis than the section of the shank groove 6, which section faces the distal end 9 of the shank. Such a design can be taken, for example, from the DE 298 22 745 U1 (corresponding to U.S. Ser. No. 09/468 057, filed on Dec. 20, 1999).

It is also possible that at least the shank section with the grooves 6 is designed conically tapering in direction of the cylindrical section 7. It is hereby possible that the base of all grooves 6 has the same diameter.

What is claimed is:

1. A punching, stamping rivet comprising a frustum-shaped rivet head and a shank following thereafter, said shank having a first end proximate said frustum-shaped rivet head and a second end distal thereto whereat there is provided a distal section, the frustum-shaped rivet head having a top surface configured to become oriented flush with a surface of a structural part to which the rivet is to be secured and a conical section tapering from a first outer diameter of the top surface to a second outer diameter of the shank less than the first diameter, wherein at least three identical and mutually adjacent shank grooves are provided each having a triangular cross section and being oriented between said first end and said distal section, a base of one shank groove closest to said frustum-shaped rivet head transitioning through a first surface to said first end and wherein between a base of said one shank groove and a base of each mutually adjacent shank groove there is arranged a common tip of the shank grooves having an outer diameter no greater than the second diameter of the shank and wherein the base of a shank groove closest to said distal section transitions through a second surface to said distal section, whereby in order to create a rivet connection between two adjoining structural parts whose combined thickness is equal to or less than a combined length of said frustum-shaped rivet head and said shank, the shank punches through the structural parts forming a punched hole, and a groove is subsequently stamped in the structural part around the second end, which causes material of that structural part to penetrate under a plastic deformation into the plural mutually adjacent shank grooves.

2. The punching, stamping rivet according to claim 1, wherein at least four identical and mutually adjacent shank grooves are provided between said first end and said distal section of said shank.

3. The punching, stamping rivet according to claim 1, wherein at least five identical and mutually adjacent shank grooves are provided between said first end and said distal section of said shank.

4. The punching, stamping rivet according to claim 1, wherein the plural shank grooves are annularly arranged.

5. The punching, stamping rivet according to claim 1, wherein the base of all grooves has the same diameter and wherein the common tip between the plural mutually adjacent shank grooves is triangular in cross section.

\* \* \* \* \*